(12) United States Patent
Martins

(10) Patent No.: US 6,671,419 B1
(45) Date of Patent: Dec. 30, 2003

(54) METHOD FOR REDUCING SHADOWS AND/OR NOISE IN A DIGITAL IMAGE

(75) Inventor: Fernando C. M. Martins, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/346,325

(22) Filed: Jul. 2, 1999

(51) Int. Cl.⁷ .................................................. G06K 9/40
(52) U.S. Cl. ........................ 382/274; 382/275; 382/174; 358/463; 358/464
(58) Field of Search ................................ 382/274, 275, 382/168, 170, 171, 172, 174; 358/461, 463, 464

(56) References Cited

U.S. PATENT DOCUMENTS

| | | | | |
|---|---|---|---|---|
| 5,592,567 A | * | 1/1997 | Kilger | 382/199 |
| 5,764,306 A | | 6/1998 | Steffano | |
| 5,781,198 A | * | 7/1998 | Korn | 345/634 |
| 5,812,787 A | | 9/1998 | Astle | |
| 5,987,159 A | * | 11/1999 | Nichani | 382/141 |

OTHER PUBLICATIONS

U.S. patent application No. 09/296,451, filed Apr. 21, 1999.
U.S. patent application No. 09/205,638, filed Dec. 3, 1998.
U.S. patent application No. 09/216,184, filed Dec. 18, 1998.
U.S. patent application No. 09/156,571, filed Sep. 17, 1998.
U.S. patent application No. 09/222,232, filed Dec. 29, 1998.
U.S. patent application No. 09/205,638, filed Dec. 3, 1998.
U.S. patent application No. 09/179,491, filed Oct. 26, 1998.
U.S. patent application No. 09/206,791, filed Dec. 7, 1998.
U.S. patent application No. 09/216,184, filed Dec. 18, 1998.
U.S. patent application No. 09/291,799, filed Apr. 14, 1999.
U.S. patent application No. 09/221,666, filed Dec. 23, 1998.
U.S. patent application No. 09/074,556, filed May 7, 1998.
U.S. patent application No. 09/052,493, filed Mar. 30, 1998.
U.S. patent application No. 09/109,571, filed Jul. 2, 1998.
U.S. patent application No. 09/151,555, filed Sep. 11, 1998.
U.S. patent application No. 09/767,362 filed Dec. 18, 1996.
Wang,Demin; "A Multiscale Gradient Algorithm for Image Segmentation Using Watersheds," Communications Research Centre, 1997, pp. 2043–2052.
Wang, Demin and Labit, Claude, "Morphological Spatio–Temporal Simplification for Video Image Simplification," Signal Processing Image Communication, 1997, pp. 161–170.
Wang, Demin, "Unsupervised Video Segmentation Based on Watersheds and Temporal Tracking," IEEE Transactions on Circuits and Systems For Video Technology, vol. 8, No. 5, Sep. 1998.

* cited by examiner

*Primary Examiner*—Thomas D. Lee
(74) *Attorney, Agent, or Firm*—Sharon Wong

(57) ABSTRACT

Briefly, in accordance with one embodiment of the invention, a method of reducing shadows and/or noise in a digital image includes the following. A noise floor for the digital image is estimated. A threshold level for a difference image of the digital image and a background image is determined based, at least in part, on the noise floor estimate. The digital image is modified based, at least in part, on the determined threshold level and the difference image.

17 Claims, 5 Drawing Sheets

METHOD FOR REDUCING SHADOWS AND/OR NOISE IN A DIGITAL IMAGE

RELATED APPLICATION

This patent application is related to concurrently filed U.S. patent application Ser. No. 09/347,481, titled "Method for Segmenting a Digital Image," by F. Martins and R. Hazra, filed Jul. 2, 1999, assigned to the assignee of the present invention and herein incorporated by reference.

BACKGROUND

1. Field

This disclosure relates to processing digital images and, more particularly, to reducing shadows in a digital image.

2. Background Information

In digital imaging systems, a variety of forms of digital image processing operations are performed. Frequently, the processing applied depends on the particular application. Nonetheless, one difficulty in digital image processing is dealing with shadows that may be cast by an object appearing in the digital image. Again, this depends somewhat on the particular application, however, in a variety of applications, shadows may become problematic. For example, where digital images are employed in automated target acquisition and tracking, surveillance applications, or navigation applications performed automatically by a navigational platform, the shadows may result in errors in tracking and/or navigation. Likewise, where digital images are interpreted, such as by a computer or similar computationally intensive processing apparatus or device, such shadows may result in errors in interpretation. For example, where gestures are to be interpreted, shadows may result in errors in the interpretation of the gesture. There are many other possible examples in which shadows in a digital image are not desirable. A need, therefore, exists for a method or technique of addressing, through digital image processing, shadows that may appear in a digital image.

SUMMARY

Briefly, in accordance with one embodiment of the invention, a method of reducing shadows and/or noise in a digital image includes the following. A noise floor for the digital image is estimated. A threshold level for a difference image of the digital image and a background image is determined based, at least in part, on the noise floor estimate. The digital image is modified based, at least in part, on the determined threshold level and the difference image.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously described, in a variety of applications, it is desirable to have the capability to at least reduce, and possibly even remove, shadows that may be cast by objects in a digital image. Such shadows may result from the positioning of an object with respect to a source of illumination and with respect to a backdrop or background on which the shadow is cast. For example, such shadows may make it difficult to interpret the digital image, such as for surveillance, tracking, navigation or for gesture interpretation, such as if a smart TV or computer, for example, is to interpret the human gestures as commands. Of course, the invention is not limited in scope to any particular application. There may be a whole host of different situations in which it is desirable to have the capability to reduce shadows cast by one or more objects in a digital image.

Figure 2:
FIG. 2 is a digital image reproduced prior to digital image processing by an embodiment in accordance with the present invention.

Although the invention is not limited in scope in this respect, FIG. 2 illustrates a typical processed digital image, although, here, for purposes of illustration, the image is printed rather than displayed, such as on a display device. As illustrated in FIG. 2, depending on the position of illumination with respect to the object, a shadow is cast in the background portion of the image by the object. It is, of course, appreciated that the invention is not limited in scope to shadows cast via a human object or to images in which there is only a single object. FIG. 2 is simply provided for purposes of illustration and is not limiting in any respect.

Figure 1:
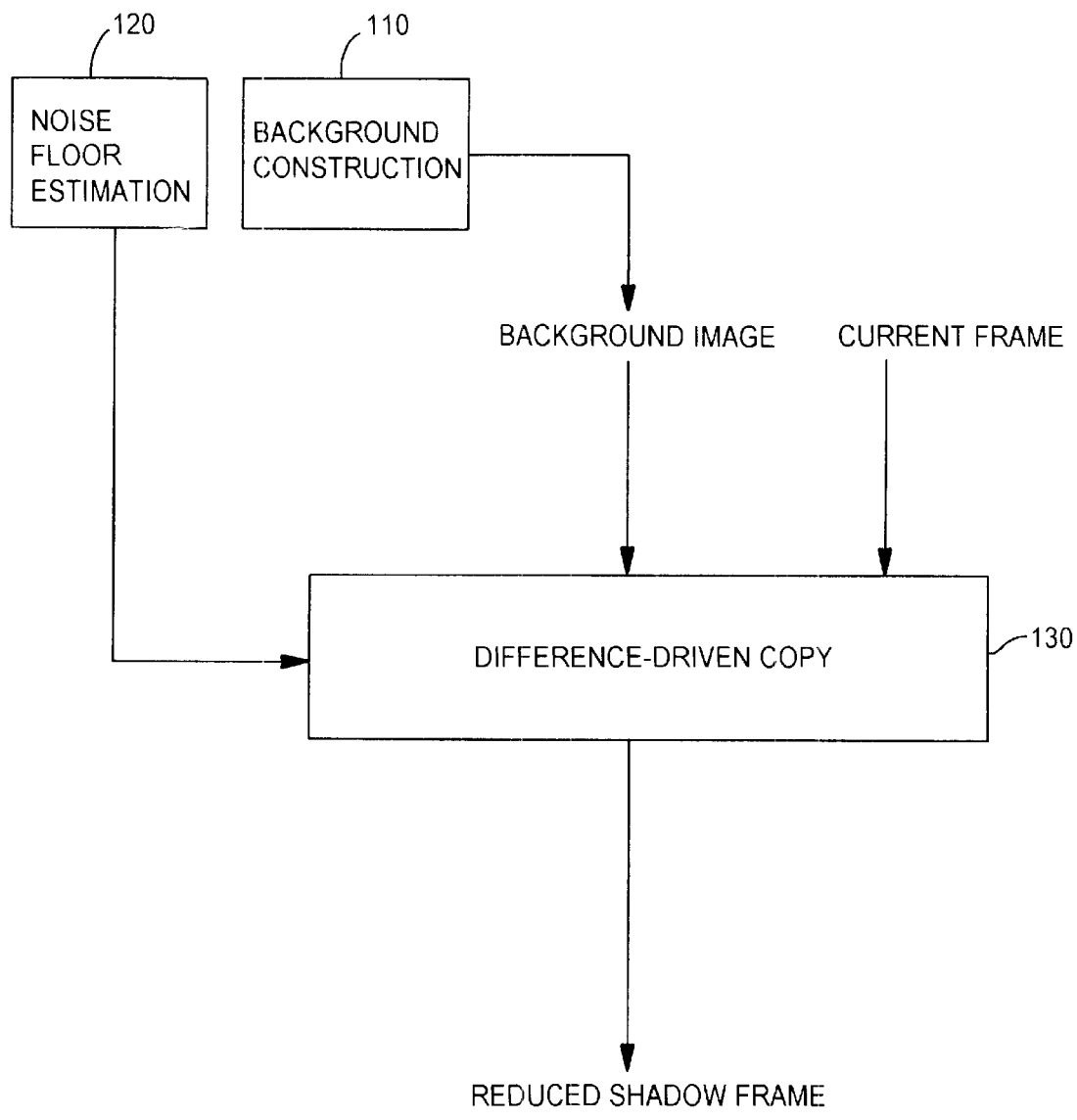
FIG. 1 is a block diagram illustrating an embodiment of a technique of reducing shadows and/or noise in a digital image in accordance with the present invention.

FIG. 1 is a block diagram illustrating an embodiment in accordance with the present invention. As illustrated in FIG. 1, it is desirable to first engage in background construction. Background construction is illustrated in FIG. 1 by a block 110. In this particular embodiment, a "noise free" or "noise reduced" background image is constructed. In this particular embodiment, although the invention is not limited in scope in this respect, the first three incoming frames from a digital imager or similar device are taken of a particular background with respect to which an object or objects shall be positioned. Therefore, in this particular embodiment, it is assumed that the camera or imager is fixed in geometry, pose, and internal gains, the illumination is invariant, and the background is static. It is further noted that this technique is not limited to the type of camera or imager employed. For example, an analog camera could be employed, where the image is then converted to a digital image. Likewise, a charge coupled device (CCD) or complementary metal-oxide semiconductor (CMOS) digital camera may be employed. However, if a CMOS camera is employed, it is assumed that the CMOS sensors are not operating in saturation.

The first three incoming frames of the static background are employed to compute a pixel-wise temporal median image. In this particular embodiment, this means that for each pixel location of a particular image size or layout, the temporal median pixel signal value of the three successive images or frames at each pixel location is employed to produce the "median" image. This produces an image that may be employed with the other three previously captured images or frames to estimate the noise floor of a digital image that is produced by the imager or camera.

In this particular embodiment, the median, in contrast with other possible statistical approaches, is employed to address the camera or sensor induced noise that typically occurs. Frequently, for example, such as with a charge coupled device (CCD) sensor, although the invention is not limited in scope in this respect, the nature of the noise created is "salt and pepper" and or spurious noise across the image. More specifically, individual or groupings of pixels randomly may either significantly exceed or fall below the overall distribution level of pixel signal values present across the image. Of course, any number of different statistical approaches may be employed. Furthermore, three temporal frames are employed in this particular embodiment, but any number of frames may be employed in another embodiment.

In this particular embodiment, the absolute differences in each pixel location between the median image and each of the three images shall be computed and then these differences are employed to form several histograms of absolute differences or a probability density function, as described in more detail hereinafter. However, in an alternative embodiment, instead, to form a histogram, any or all possible combinations of the three images may be employed to obtain absolute differences without producing a median image. Likewise, alternatively, the set of images may be averaged or one of the three images may be selected as most representative, to use in place of the "median" image. Again, any convenient statistical technique to attempt to isolate the noise embedded in these images may be employed.

As previously indicated, the set of frames or images captured during initialization are employed to estimate the noise floor for a digital image to be produced by the camera or imager. Because the set of captured frames provide raw "snapshots" of the particular background, the pixel-wise absolute differences between each of these frames and the median image are employed to estimate the noise floor of the camera or imager. Assuming the scene is static, the differences are treated as due to camera/capture induced noise.

Figure 4:
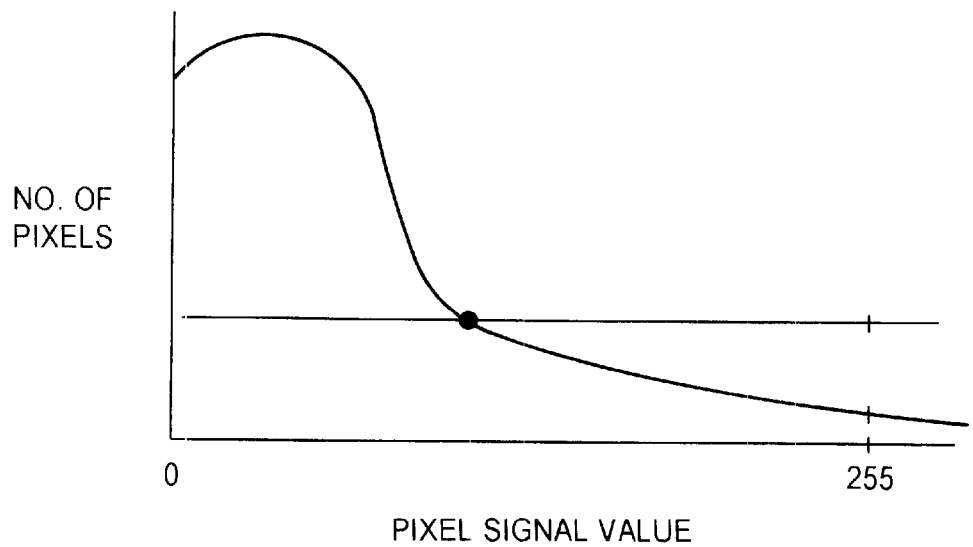
FIG. 4 is a plot illustrating the operation of an embodiment in accordance with the present invention to process statistical data derived from a digital image.

A 256 bin histogram of the absolute difference values for each difference frame is constructed. In this immediate context, a difference frame or difference image refers to the difference between the captured image and the median image on a pixel-wise basis, although, in other contexts in this specification it may not mean this. A histogram or equivalent is formed by determining over the entire image the number of pixels that have a particular absolute value, over the range of 256 values in this embodiment. Of course, it is appreciated that the invention is not limited in scope to a 256 bin histogram. For example, in this particular embodiment, each pixel location includes eight bits of data for each color plane, assuming, for example, a YUV color space format. However, the invention is not limited in scope to employing eight bits, to employing a YUV color space format, or to employing a 256 bin histogram, even assuming eight bits are employed in a YUV color space format. Furthermore, the invention is not limited in scope to employing color at all. Likewise, an equivalent approach other than absolute difference may be employed. For example, the square of the differences, or a similar alternative may be used. However, assuming, for this particular embodiment, that a YUV color space format and a 256 bin histogram for each different frame is created, typically the histogram created will have a main lobe closer to the smaller valued differences, such as illustrated, for example, in FIG. 4. One reason for this is because noise produced by the camera or imager is "colored" rather than "white." That is, the frequency spectrum of the noise produced is not essentially flat across all frequencies, in the mean square sense, and, therefore, is unlike "ideal" white noise in this respect. This is also illustrated in FIG. 4. One approach, once this histogram is created, that might be employed, would be to simply integrate the histogram to a predetermined level such as a "two sigma" point or "three sigma" point, or other similar statistical approach. Such approaches are within the scope of the present invention. Alternatively, in this particular embodiment, a robust approach based on empirical observations using digital images is employed, as described below.

In this particular embodiment, a goal is to determine a noise floor threshold for the pixel-wise absolute differences that will effectively reject a majority of differences represented by the main lobe of the created histogram. Empirically, it was determined that this goal is achieved by setting the noise floor to the lowest pixel signal value difference level in the measured absolute difference histogram with a histogram occurrence or frequency level that is less than the occurrence or frequency level would be over the image for "ideal" white noise. For ideal white noise, the histogram is flat and has a magnitude occurrence level in each of the histogram bins of the height times width of the image, in pixels, divided by 256 elements, in this embodiment. Therefore, for a given histogram, the noise floor estimate is illustrated in FIG. 4 by an intersection of the example histogram plot or curve and a plot or curve representing ideal white noise. This approach, in this embodiment, is repeated for the three captured frames and the noise floor level is set as the maximum value of the three; although, again, the invention is not limited in scope in this respect. Likewise, because, in this particular embodiment, the YUV color space format is employed, the differences are computed separately for each color plane and the three noise-floor estimates are similarly set for each color plane individually. Of course, as previously indicated, the invention is not limited in scope to a particular color space format. For example, this same approach may be employed in RGB color space format or any other desired color space format or a format that does not employ color and merely provides luminance, for example.

It is noted that camera noise tends to be characterized statistically as Gaussian or Poisson in distribution, although the invention is not limited in scope in this respect. It is desirable through the previously described process, in this embodiment, to determine a level that above which the differences are due primarily to deterministic contributors, such as the content of the image, and below which the differences are due primarily to random contributors, such as camera or imager noise. Therefore, in this particular embodiment, for absolute differences below the noise floor estimate, these are assumed to be based on or induced by camera noise, whereas, for those absolute differences above the noise floor estimate, these are assumed to be based on, or associated with, deterministic characteristics of the digital image, such as the presence of one or more objects. A reason this approach is employed is because, practically speaking, if the noise generated by the camera/imager were in reality ideal white noise, then discriminating an object from the noise would be extremely difficult if the energy of the object is below the pixel signal value level for ideal white noise. Therefore, for differences below the white noise level, it is assumed that these differences are due to induced noise rather than deterministic characteristics of the image.

Figure 5:
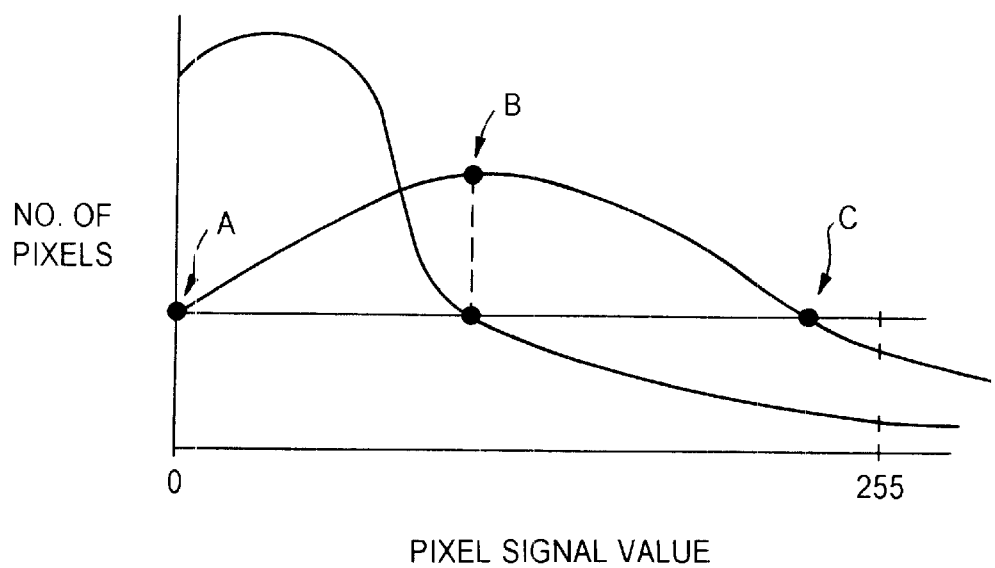
FIG. 5 is a another plot illustrating the operation of an embodiment in accordance with the present invention to process statistical data derived from a digital image.

Once the noise floor of the digital image to be produced has been estimated, a threshold level is determined that is employed to distinguish or discriminate, and ultimately reject, pixel signal value information attributable to shadows in the digital image from those attributable to the object or objects itself. This is accomplished by producing another difference image, in this case a difference image between the digital image itself and the background median image. Again, a histogram of the absolute differences is produced. FIG. 5, therefore, illustrates on the same graph both a sample or example histogram plot or curve produced from this difference image and an example or sample histogram plot or curve produced to obtain the noise floor estimate, respectively. Of course, although not illustrated, because these images in this embodiment have three color planes, a difference image and histogram is produced for each plane, as in the case of noise floor estimation.

In this embodiment, to discriminate shadows, it is desirable to adaptively raise the threshold level above the camera/imager noise floor estimate until shadows are rejected. Therefore, we initially set the threshold to the camera noise floor estimate and increment the threshold until shadows are rejected. Empirically, it was determined that this goal is achieved by setting the threshold to the lowest pixel signal value difference level in the measured absolute difference histogram with an occurrence level or frequency that is less than the level would be for "ideal white noise" over the image. This is illustrated in FIG. 5 by point B. Shadow rejection is performed only on the luminance plane in this particular embodiment, although the invention is not restricted in scope in this respect. Effectively, this particular approach adaptively modifies the noise floor estimate to estimate a difference level large enough to discern signal information associated with the object or objects that is not a shadow or noise. In this particular embodiment, the estimate of the noise floor is employed as a first estimate of the threshold, as illustrated in FIG. 5, and then the threshold is adaptively modified until a more acceptable threshold for shadow rejection is obtained. This is illustrated in FIG. 5 by point C. A reason for beginning with the estimate of the noise floor is to ensure that, using the histogram values from the difference image of the digital image and the background image, here, the "median" background image, estimation of the threshold level for shadow rejection begins at a value that ensures noise rejection before shadows are considered. For example, point A in FIG. 5 is avoided by this approach.

Once this threshold level is determined, the digital image is modified based, at least in part, on the determined threshold level and on the difference image of the digital image and the background image. The digital image is modified by including in the modified image those pixel signal values having pixel signal absolute difference values in corresponding pixel locations in the difference image that exceed the determined threshold level and rejecting the remaining pixels by setting them to an arbitrary fixed value. In this particular embodiment, this is implemented by including the pixel signal value in the modified image if the absolute difference value in that pixel location in the difference image in at least one of the three color planes exceeds the threshold level determined for that color plane. Of course, in one embodiment, only the luminosity plane signal information may be employed to determine the threshold level and modify the digital image. A reason this approach may be employed is because the dominant signal information is contained in the luminance plane and not necessarily in the chrominance planes, particularly with respect to shadows. Therefore, in this particular embodiment, shadows, noise and the static background are removed from the digital image based, at least in part, on the threshold level and on the difference image.

Figure 3:
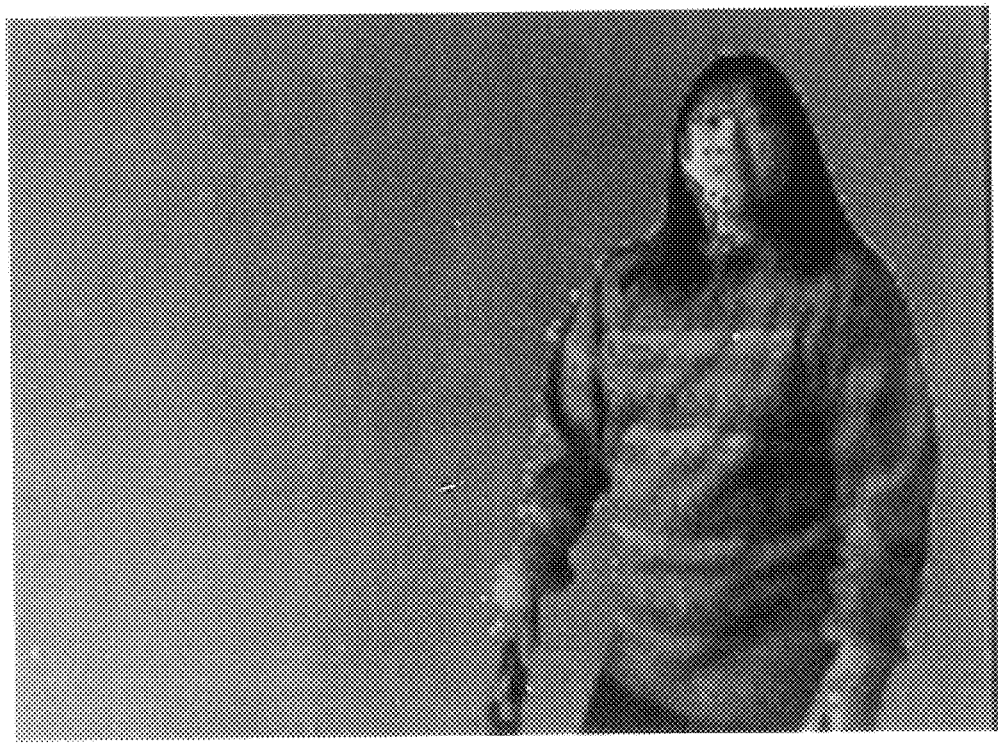
FIG. 3 is the digital image of FIG. 2 after being processed by an embodiment in accordance with the present invention.

As illustrated in FIG. 3, a modified digital image, processed according to an embodiment in accordance with the present invention, will have the camera/imager noise and shadowing of the digital image reduced or removed, as desired; however, there may also be "holes" or "pockets" of pixels in the image. This is a by-product of employing an embodiment in accordance with the present invention. Nonetheless, such "holes," "gaps," or "pockets" of missing pixels may be addressed through the application of digital filtering techniques. For example, low pass filtering may be applied to the image. Alternatively, the edge of the object or objects may be identified, and the pixel signal values in the original image within that edge may be employed. Although the invention is not limited in scope in this respect, similar examples of filtering that may be applied to reduce or remove the shadows while preserving the signal information in the image, particularly the object or objects, are described in the aforementioned concurrently filed patent application, "A Method for Segmenting a Digital Image." In particular, the aforementioned patent application includes a specialized digital filter to address such "holes," although, of course, this invention in not restricted in scope to using that approach. A number of alternative approaches are possible and will provide satisfactory results.

Figure 6:
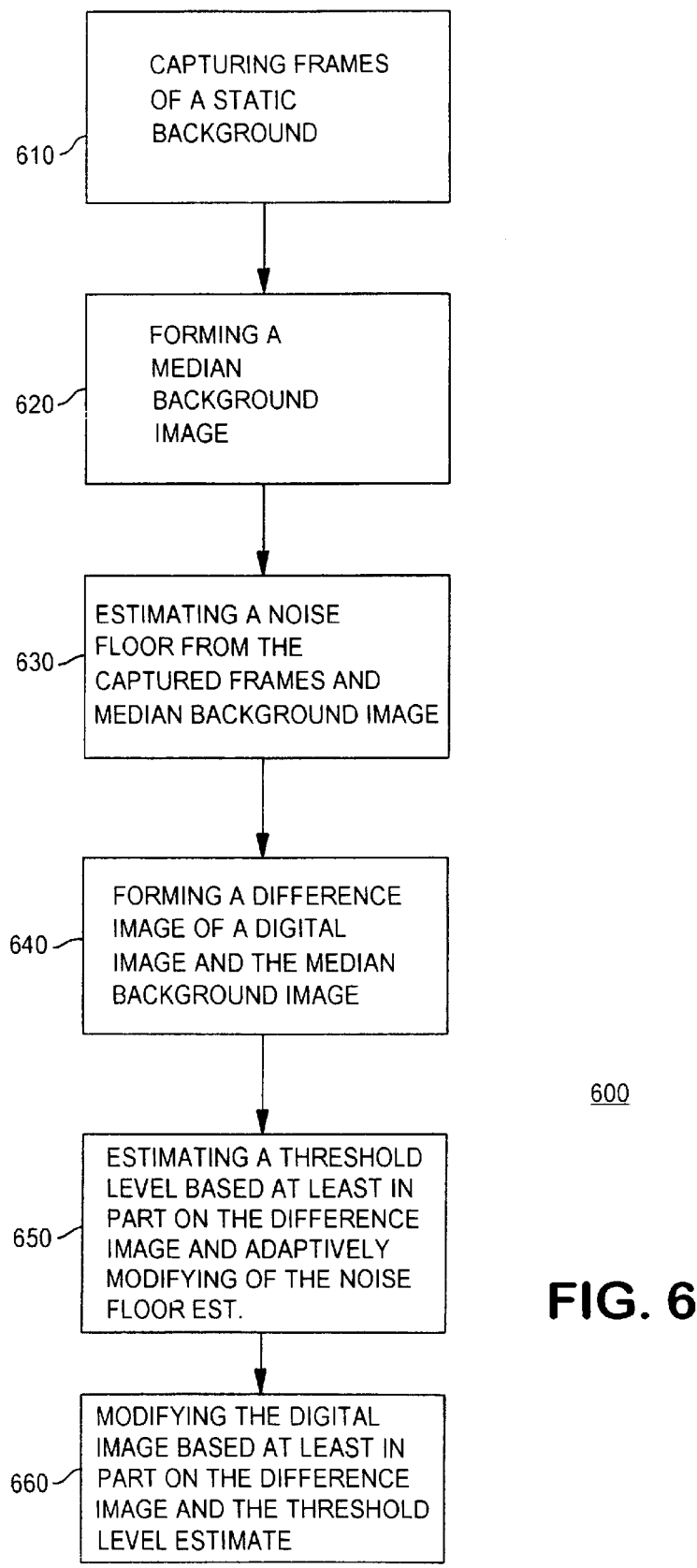
FIG. 6 is a flowchart illustrating an embodiment of a method in accordance with an embodiment in accordance with the invention.

FIG. 6 is a flowchart illustrating an embodiment in accordance with the invention. As illustrated, the noise floor is estimated, based at least in part on a plurality of difference images obtained from a plurality of captured images. At block 620, a background image is formed by computing the temporal median. This image is employed to form difference images. A histogram is produced from the difference images. At block 630, the noise floor is estimated from the histogram. A threshold level for a difference image of the original digital image and the median background image is then determined, This particular difference image is formed at block 640. A histogram of this difference image is formed and the threshold level is adaptively estimated from the histogram, at block 650. At block 660, a modified digital image is formed using the difference image and the determined threshold level.

Of course, as previously indicated, the invention is not restricted in scope to a particular embodiment. Therefore, whereas one embodiment may comprise a method of reducing shadows and/or noise in a digital image, another embodiment may comprise a storage medium, such as a hard drive, flip-flop, compact disk, or other storage medium. Such a storage medium, for example, may have instructions stored thereon, which, when executed, such as by a computing platform, such as a set-top box, personal computer, desktop or laptop computer, or other platform, result in shadows and/or noise being reduced in a digital image, such as in a manner in accordance with the present invention. Likewise, an embodiment in accordance with the invention may comprise a variety of possible computing platforms for processing digital images. One such platform may include, for example a storage medium, such as previously described, e.g., one having stored thereon instructions that, when executed, result in shadows and/or noise being reduced, such as in a manner in accordance with the present invention.

While certain features of the invention have been illustrated and described herein, many modifications, substitutions, changes, and equivalents thereof will now occur to those skilled in the art. It is, therefore, to be understood that the appended claims are intended to cover all such modifications and changes as fall within the true spirit of the invention.

What is claimed is:

1. A method of reducing shadows and/or noise in a digital image comprising:
   estimating a noise floor of the digital image;
   determining a threshold level for a difference image of the digital image and a background image based, at least in part, on the noise floor estimate, the noise floor is estimated based, at least in part, on the difference image of the background image and another background image; and
   modifying the digital image based, at least in part, on the determined threshold level and the difference image.

2. The method of claim 1, wherein the noise floor is estimated based, at least in part, on a plurality of difference images obtained from a plurality of captured background images.

3. The method of claim 2, wherein the plurality of difference images are obtained by forming a median background image from the plurality of captured background images and taking the difference on a pixel-wise basis between the median background image and each image of the plurality of captured background images.

4. The method of claim 1, wherein the noise floor is estimated based, at least in part, on statistical data, derived from the difference image, estimating a pixel signal value difference level if the background image included ideal white noise.

5. The method of claim 4, wherein the threshold level is determined based, at least in part, on statistical data derived from the difference image of the digital image and the background image, estimating the pixel signal value difference level if the digital image included ideal white noise.

6. The method of claim 5, wherein determining the threshold level comprises:
   determining initially the occurrence level for the noise floor estimate in the difference image of the digital image and the background image; and then,
   adaptively modifying the noise floor estimate to estimate the pixel signal value difference level if the digital image included ideal white noise.

7. The method of claim 6, wherein the digital image pixel signal values are a color space format comprising three color signal planes of pixel signal values, and wherein the threshold level is determined and adaptively modified for at least one of the color planes of pixel signal values.

8. The method of claim 7, wherein the color space format comprises a YUV color space format and the at least one of the color planes comprises a luminosity (Y) color plane.

9. The method of claim 1, wherein modifying the digital image comprises:
   including in a modified image pixel signal values for pixel locations having corresponding pixel signal values in the difference image of the digital image and the background image that at least exceed the threshold level.

10. An article comprising: a storage medium;
    said storage age, said instructions, when executed by a computing platform, resulting in the following:
    estimating a noise floor of the digital image, the noise floor being estimated based, at least in part, on a plurality of difference images obtained from a plurality of captured background images;
    determining a threshold level for a difference image of the digital image and a background image based, at least in part, on the noise floor estimate; and
    modifying the digital image based, at least in part, on the determined threshold level and the difference image.

11. The article of claim 10, wherein said instructions, when executed, further resulting in:
    the noise floor being estimated based, at least in part, on statistical data, derived from a difference image, estimating the pixel signal value difference level if the background image included ideal white noise.

12. The article of claim 11, wherein said instructions, when executed, further resulting in:
    the threshold level being determined based, at least in part, on statistical data, derived from the difference image of the digital image and the background image, estimating the pixel signal value difference level if the digital image included ideal white noise.

13. The article of claim 12, wherein said instructions, when executed, further resulting in:
    modifying the digital image by including in the modified image pixel signal values for pixel locations having corresponding pixel signal values in the difference image of the digital image and the background image that at least exceed the threshold level.

14. An apparatus for processing digital images comprising:
    a computing platform;
    said computing platform including a storage medium;
    said storage medium having stored thereon instructions to reduce shadows and/or noise for a digital image, said instructions, when executed by a computing platform, resulting in the following:
    estimating the noise floor of the digital image, the noise floor being estimated based, at least in part, on a plurality of difference images obtained from a plurality of captured background images;
    determining a threshold level for a difference image of the digital image and a background image based, at least in part, on the noise floor estimate; and
    modifying the digital image based, at least in part, on the determined threshold level and the difference image.

15. The apparatus of claim 14, wherein said instructions, when executed, further resulting in:
    the noise floor being estimated based, at least in part, on statistical data, derived from a difference image, estimating the pixel signal value difference level if the background image included ideal white noise.

16. The apparatus of claim 15, wherein said instructions, when executed, further resulting in:
    the threshold level being determined based, at least in part, on statistical data, derived from a difference image of the digital image and the background image, estimating the pixel signal value difference level if the digital image included ideal white noise.

17. The apparatus of claim 16, wherein said instructions, when executed, further resulting in:
    modifying the digital image by including in the modified image pixel signal values for pixel locations having corresponding pixel signal values in the difference image of the digital image and the background image that at least exceed the threshold level.

* * * * *